United States Patent [19]

Horowitz et al.

[11] 4,173,156
[45] Nov. 6, 1979

[54] INFINITELY VARIABLE CONE PULLEY GEAR

[75] Inventors: Alexandre Horowitz, Eindhoven; Rudolf J. G. A. van der Hoorn, Nuenen; Jozef W. M. Kummeling, Leende, all of Netherlands

[73] Assignee: Volvo Car B.V., Eindhoven, Netherlands

[21] Appl. No.: 837,922

[22] Filed: Sep. 29, 1977

[30] Foreign Application Priority Data

Oct. 5, 1976 [NL] Netherlands .................... 7611001

[51] Int. Cl.² .................................................. F16H 55/52
[52] U.S. Cl. .................... 74/230.17 F; 74/230.17 M
[58] Field of Search .............. 74/230.17 F, 230.17 E, 74/230.17 M, 230.17 R, 230.17 A, DIG. 1

[56] References Cited

U.S. PATENT DOCUMENTS

| 2,911,838 | 11/1959 | McGrath | 74/230.17 F |
|---|---|---|---|
| 2,993,385 | 7/1961 | Karig et al. | 74/230.17 F |
| 3,137,178 | 6/1964 | Bruet | 74/230.17 F |
| 3,195,368 | 7/1965 | Boudewijn | 74/230.17 F |
| 3,491,609 | 1/1970 | Henriksen | 74/230.17 E |
| 3,596,528 | 8/1971 | Dittrich et al. | 74/230.17 F |
| 3,600,960 | 8/1971 | Karig et al. | 74/230.17 F |
| 3,600,961 | 8/1971 | Rattunde et al. | 74/230.17 F |
| 3,782,213 | 1/1974 | Rattunde | 74/230.17 F |
| 4,094,203 | 6/1978 | Van Deursen et al. | 74/230.17 F |

FOREIGN PATENT DOCUMENTS

| 2133595 | 1/1972 | Fed. Rep. of Germany | 74/230.17 M |
| 1200668 | 7/1970 | United Kingdom | 74/230.17 F |

Primary Examiner—Samuel Scott
Assistant Examiner—William R. Henderson
Attorney, Agent, or Firm—Haseltine, Lake & Waters

[57] ABSTRACT

A fully hydraulic control mechanism for an infinitely variable cone pulley gear. The torque is transmitted by the intermediary of an oil cushion in a coupling between a driving and a driven element providing for a torque-dependent oil pressure in an oil circuit. The oil circuit delivers pressure on surfaces of different size of axially movable discs for primary and secondary cone pairs between which a transmission belt is running.

The oil circuit leads from the primary to the secondary cone pair through a pressure reduction device which is under speed-ratio progressive control.

25 Claims, 10 Drawing Figures

INFINITELY VARIABLE CONE PULLEY GEAR

BACKGROUND OF THE INVENTION

The invention relates to an infinitely variable cone pulley gear comprising an endless transmitting element such as a belt or chain running between two pairs of conical discs, one of these on a driving shaft and the other one on a driven shaft. At least on disc of each pair is slidable in axial direction on its shaft and hydraulic means are provided which produce and control an axial pressure on the slideable cones so as to adjust themselves automatically in dependence of the torque transmitted by the driving shaft to the driven shaft. The infinitely variable cone pulley gear shall be named hereinafter a variator.

The variator further comprises a hydraulic service line adapted to receive a pressure fluid such as oil from a suitable source under pressure and to distribute the pressure to both cone pairs to be pressurized.

DISCUSSION OF THE PRIOR ART

In a variator of this known type, as disclosed by the U.S. Pat. No. 3,596,528 apparatus as mentioned above is provided in view of the fact that the efficiency and lifetime are improved when the contact pressures of the cones against the transmitting element are not larger than is necessary for the power transmission. Therefore the requisite axial hydraulic pressure on the cones is made mainly dependent on the torque to be transmitted from one shaft to the other one. For this purpose the abovementioned service line comprises a channel in each of the driving and driven shafts under control of a pressure control valve provided with a movable intermediate element which, by means of a compression spring on the valve, projects radially outward toward the outside of the shaft and presses against an inclined cam surface provided in the bore wall of the hub of one of the axially movable conical discs of each pair thereof. By means of this inclined surface acting through the intermediate element and the compression spring upon the pressure control valve, the latter may be acted upon in response to the load to which the respective side of the transmission is subjected.

Means are provided for using the hydraulic control mechanism at the same time for obtaining a speed ratio progressive contact pressure on all discs.

SUMMARY OF THE INVENTION

The invention mainly aims to introduce simple and accurate apparatus for obtaining hydraulic forces proportional to the torque for pressing the conical discs against the transmitting belt.

The invention further aims to have the control system working automatically and without any delay or causing any impact effect on reversal of the transmission, that is when the shaft which is normally the driving shaft is driven by the shaft which is normally the driven shaft.

It is a further object to restrict the means for obtaining a torque-dependent hydraulic pressure to be supplied to the service line to only one side of the variator in a coupling between a driving and a driven shaft.

Another object is to carry out the apparatus which are applied according to the invention for the abovementioned purposes for using them at the same time to control the transmission ratio.

According to the above objects the variator position is to be nearly exclusively determined by the proportion of the hydraulic pressures on the primary and the secondary conical discs.

Another feature of the invention consists in a special choice of the proportion between the surfaces of the pair of cones under hydraulic pressure in combination with a special oil pressure reduction mechanism, designed as an adjustable proportional reduction valve the position of its adjusting element determining the proportion of the hydraulic pressures.

In many occurences as, for example, in autocar drives it is demanded that the variator transmission ratio adjusts itself automatically.

The objects of specific embodiments of the invention are to realise this in dependence on:

(a) torque and speed of revolution
(b) torque and motorvacuum
(c) torque and gas valve position
(d) speed of revolution and gas valve position.

With the application of the invention the primary hydraulic pressure is directly proportional to the torque, whereas the number of revolutions can be converted in a manner known per se by way of centrifugal forces into a power effect at a place as desired. The same is valid for the power effect of motor vacuum and gas valve position.

In a favourable implementation of the invention the hydraulic force which is dependent on the torque and the centrifugal force which is dependent on the number of revolutions, can be combined with a spring force and applied to an adjusting element by which this adjusting element and therefor the variator as well take the desired position in each combination. Instead thereof the motor vacuum and the gas valve position can be combined on the control element, whereas, moreover, a motor control can be obtained by a combination of gas valve position and speed of revolution.

DESCRIPTION OF PREFERRED EMBODIMENTS

Figure 1:
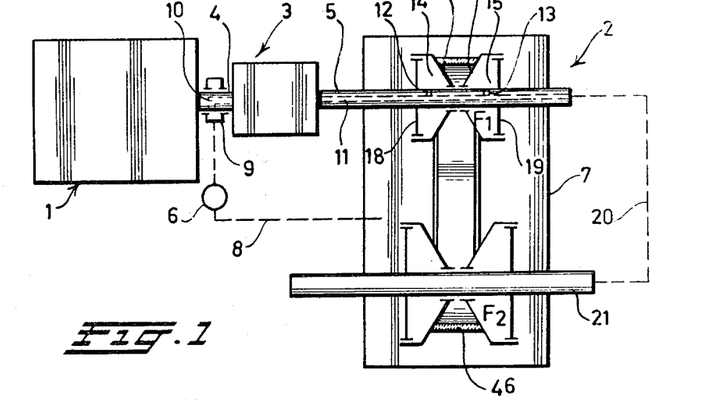
FIG. 1 is a basic sketch, illustrating the main function of a coupling element which is applied according to the invention.

A. Hydraulic exertion of bearing forces dependent on the movement:

In FIG. 1 a driving motor is symbolically designated by 1, the variator as a whole by 2 and 3 designates a coupling for the power transmission between shafts 4 and 5 by the intermediary of an hydraulic cushion, as will be described hereinafter. The coupling is shown here symbolically as a separate unit between shafts 4 and 5. From the following it will appear, however, that this coupling is preferably lodged in one of the variator discs. The oil pressure is maintained by a pump 6. The variator housing contains an oil volume and a pump line 8 leads from there, through a rotating seal 9 to a duct 10 in the shaft 4. The duct 10 is in communication with a chamber in the coupling 3 comprising the hydraulic transmission. A canal 11 leads from this cushion chamber through the variator shaft 5 and the openings 12 and 13 therein to the sealed pressure chambers 14 and 15 in the hollow variator discs. The conical walls 16 and 17 thereof are mounted axially displaceable with regard to the bottom walls 18 and 19 on the shaft 5. The pressurized hydraulic medium is supplied through a conduit 20 to a second variator shaft 21.

A more elaborated embodiment of a device comprising a hydraulic cushion for the torque transmission in a coupling will now be described with respect to FIG. 2, 3 and 4. This cushion is in a conical disc 17 of a variator section. The opposite conical disc 22 is keyed at 23 on shaft 5 which can be operated as a main driving shaft. Therefore the oil supply conduit 8 (FIG. 3) is comparable with that identically referenced in FIG. 1.

However, the canal 10 to which it is connected is now in the shaft 5 because the coupling comprising the hydraulic cushion is not located, as in FIG. 1, between two shafts 4 and 5 to be coupled, but as a coupling between shaft 5, thus being the main driving shaft and the disc 17. This disc 17 is the axially displaceable part of a hydraulically chargeable cylinder 24, keyed at 34 on the shaft 5, the cylinder pressure chamber being referenced 15 as in FIG. 1. The canal 10 connected to the pump 6 discharges into this pressure chamber through a bore 13 to which also the oil cushion chamber 25, to be discussed hereinafter, is connected through the canal 11. The conical disc 17 is indicated hereinafter as the one half coupling. In FIG. 2 and 3 can be seen that two diametrically opposite arm pieces 27 and 28 extend in axial direction from this conical disc 17 near its circumference. They are received with clearance in recesses 29 and 30 cut out from the circumference of a disc 31 which is here called the other half coupling. The latter is formed by a ring-shaped disc which is sidewardly shiftable as a so called "flat differential gear" over a small distance with regard to the shaft 5 on studs 32, 33, whereby it is supported from the cylindrical part 24 and thus indirectly on the shaft 5. It will be clear, that the coupling might also be realized by only one of the arm pieces 27, 28 (to be named hereinafter coupling arms), but in the way of the shown embodiment a better balancing of forces is obtained.

The coupling arms 27, 28 transmit the torque by their engagement with the side walls of the cavities 29-30 by the intermediary of an hydraulic cushion.

Figure 4:
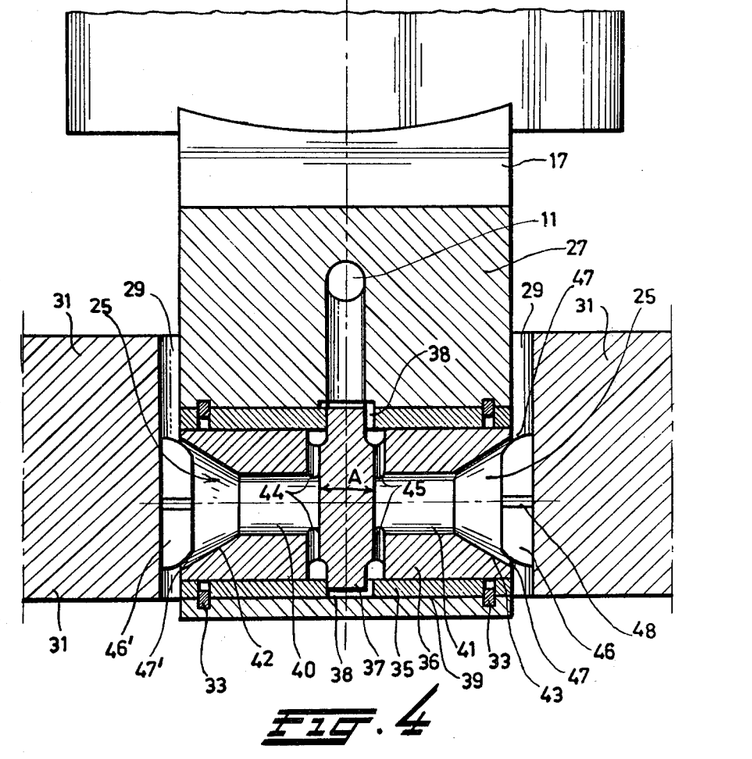
FIG. 4 a detail section on a larger scale relating to FIG. 2 and 3 along the line IV—IV of FIG. 2.

For this purpose as shown in FIG. 4 for the coupling arm 27 a bore 39 is across this arm with a lining 35, locked and sealed between rings 33. Thus the oil cushion chamber is shaped, which has been referenced before 25 in FIG. 5. A cylindrical slide valve 36 is shiftable to and fro within the lining 35 over a small distance in the direction of the arrows A. This slide 36 has a disc-shaped middle portion 37 extending by a ring-shaped rib beyond the outer circumference of the slide. Said rib is sidewardly enclosed between portions of the lining 35 with clearance by which a ring-shaped slit 38 is left free and there is also a circumferential clearance between the rib and the bore wall 39.

The slide valve 36 encloses cylindrical chambers 40 and 41 each on one side of the disc-shaped middle portion 37. The chambers 40 and 41 have outer conical exits 42 and 43 and can enter on their other side in communication with the ring slit 38 and thereby with the pressure medium canal 11 through openings 44 and 45 in dependence of the position of the slide 36 with its central disc 37.

Figure 2:
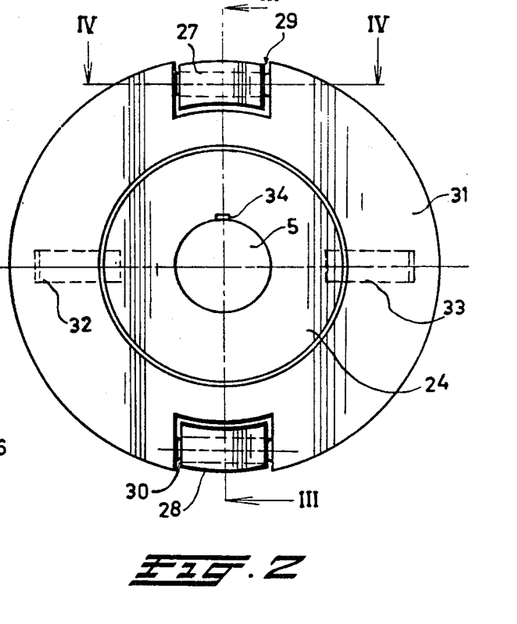
FIG. 2 shows a front view of a preferred embodiment of said coupling element.
Figure 3:
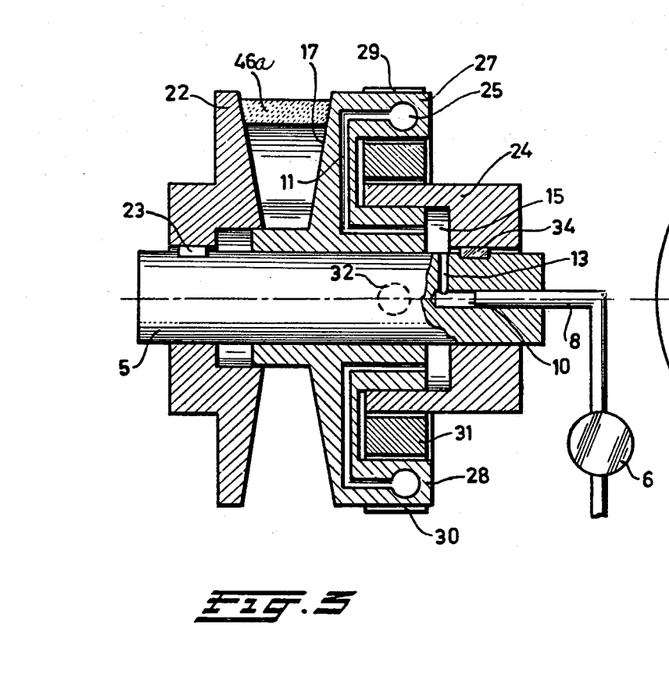
FIG. 3 a cross section along the line III—III of FIG. 2.

In the position shown in FIG. 4 it is assumed, that the coupling arm 27 is rotatably driven in right-hand direction (see therefore also FIG. 2 and 3). The disc 37 then applies itself to the left in FIG. 2 and 4 in engagement with the lining 35. The passage from the annular gap 38 to the openings 44 is then closed. The oil is now pressed through conduit 11, annular gap 38 and openings 45 into chamber 41. An hydraulic cushion is now formed because oil leaks out through the exit 43 through a annular gap 47 between a valve disc 46 in the exit mouth and the conical wall 43. This valve disc 46 is self adjusting and is pressed against the flat side wall of the excavation 29 in the ring disc 31. The annular gap 47 provides for the shaping of the hydraulic cushion, wherein the oil pressure is dependent on the torque transmitted in the coupling. The valve disc 46 has the shape of a disc cut from a ball, its spherical side bordering the annular gap 47 at the inner side. The bore 48 provides for lubrication of the disc surface engaging the side wall of the cavity 29. The valve disc 46 need not be exactly in the center of the conical opening as the total cross sectional area of the annular gap 47 is not changed thereby.

When the pump 6 has a predetermined output, a balance will adjust itself between the circumferential force K and the pressure $p_i$ in chamber 41, because the annular gap 47, through which oil leaks out, adjusts itself since the oil pressure is dependent on the torque transmitted in the coupling which is the force K multiplied by the radius.

When the surface of the valve loaded by the pressure $p_i$ is indicated by $D_p$, it applies that:

$$p_i \cdot D_p = \text{circumferential force } K.$$

$$\text{The leakage } Q = \frac{bh^3 (p_i - p_o)}{1,2\eta l} \text{ cm}^3/s$$

wherein:
h = slit height
b = slit width ($=\pi D_m$)
$p_o$ = pressure in the variator housing into which the oil leaks out through the slit 47.
$\eta$ = dynamic viscosity
l = slit length.

When Q is constant and K increases, h will decrease, the value of the other quantities remaining almost the same. This means, that $(p_i - p_o)$ must increase, because $h^3(p_i - p_o)$ is about constant. Now $p_o$ is constant herein, from which follows that $p_i$ is proportional to the value of K.

From this follows that the pressure in chamber 41 is proportional to the torque transmitted by the shaft. This pressure is equal to the pressure $p_i$ in the chamber 15 (FIG. 3), which provides for the axial bearing pressure of disc 17 on the belt 46a.

When the direction of rotation is reversed, the slide 36 shifts a few tenth of mm to the right, by which the disc portion 37 of the disc 36 applies itself on the other wall side of its lodging chamber in the lining 35 in engagement therewith and the entry from the canal 11 to the openings 45 is shut, but the entry to the openings 44 is opened. The chamber 41 is thereby shut off for the oil pressure and the medium chamber 40 enters into function as hydraulic cushion chamber by means of the annular gap 47' shaped at the end thereof between the valve disc 46' and the slide mouth 42. The bearing force for the belt is thus fully independent of the direction of rotation but is solely determined by the magnitude of the torque.

Because the result aimed at can be obtained with a movement clearance of only a few tenth of mm, no impact effect occurs on the reverse of rotation.

It will be clear, that the coupling as described, need not necessarily be combined with a variator disc 17. For a coupling unit 3 of FIG. 1 it might be imagined to provide a disc with coupling arms on the shaft 4 and the differential disc 31 on shaft 5.

Figure 5:
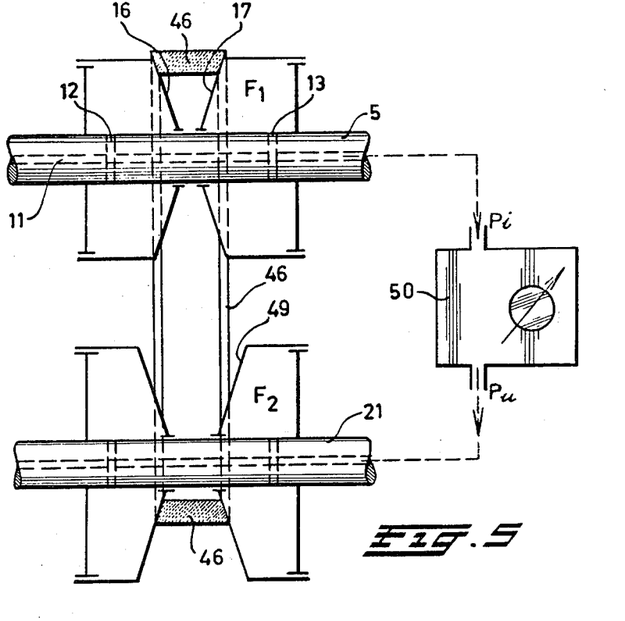
FIG. 5 is a basic sketch relating to the introduction of an oil pressure reduction device in the pressure service line between two variator shafts for the control of the transmission ratio.

B. Adjustment of the desired transmission ratio:

The elucidation below is given on the basis of FIG. 5 wherein the hydraulic medium under torque-dependent pressure is supplied through canal 11 to a set of conical discs shaped as pistons with an active surface $F_1$. For the sake of simplicity the presentation of FIG. 1 has been followed, according to which both cones of each pair of conical discs as indicated by 16 and 17 are hollow-shaped and each of them forms an axially shiftable element of a pressure cylinder which can be hydraulically loaded. The following is, however, applicable by use of a pair of conical discs 22, 17 as shown in FIG. 3, wherein only the conical disc 17 is axially movable for the purpose of adjustment. An axial bearing force $P_iF_1$ will become valid for the cone surface $F_1$. The minimum pressure in the enclosed medium volume, thus $P_{imin}$ in the cushion chamber 25 (40 resp. 41 in FIG. 4) has to be so large, that a sufficient clamping force on a belt 46 will be reached. The piston surfaces on the shaft 21 have a dimension $F_2$ and $F_2 > F_1$. The value of $F_2$ is at least so large that, when the oil pressure $p_i$ is active thereon (the axial bearing force being $p_iF_2$ wherein $F_2 > p_iF_1$), the cone flanks on the shaft 21 are moved toward each other to a maximal extent, thereby pressing the cone flanks on shaft 5 away from each other, whereby the smallest track radius on shaft 5 and the largest track radius on shaft 21 is obtained for the belt 46.

By inserting an oil pressure reduction device 50 in the oil conduit leading from shaft 5 to shaft 21 the oil pressure in shaft 21 can be reduced with respect to that in shaft 5 to a value $p_u$.

When $p_iF_1$ is equal to $p_uF_2$ ($p_u$ has then been reduced to such an extent that $p_u = (F_1/F_2)p_i$) the variator takes the symmetrical position (1:1), whereas further reduction of $p_u$ causes an increase of the runway radius on shaft 5 at the cost of that on shaft 21.

Figure 6:
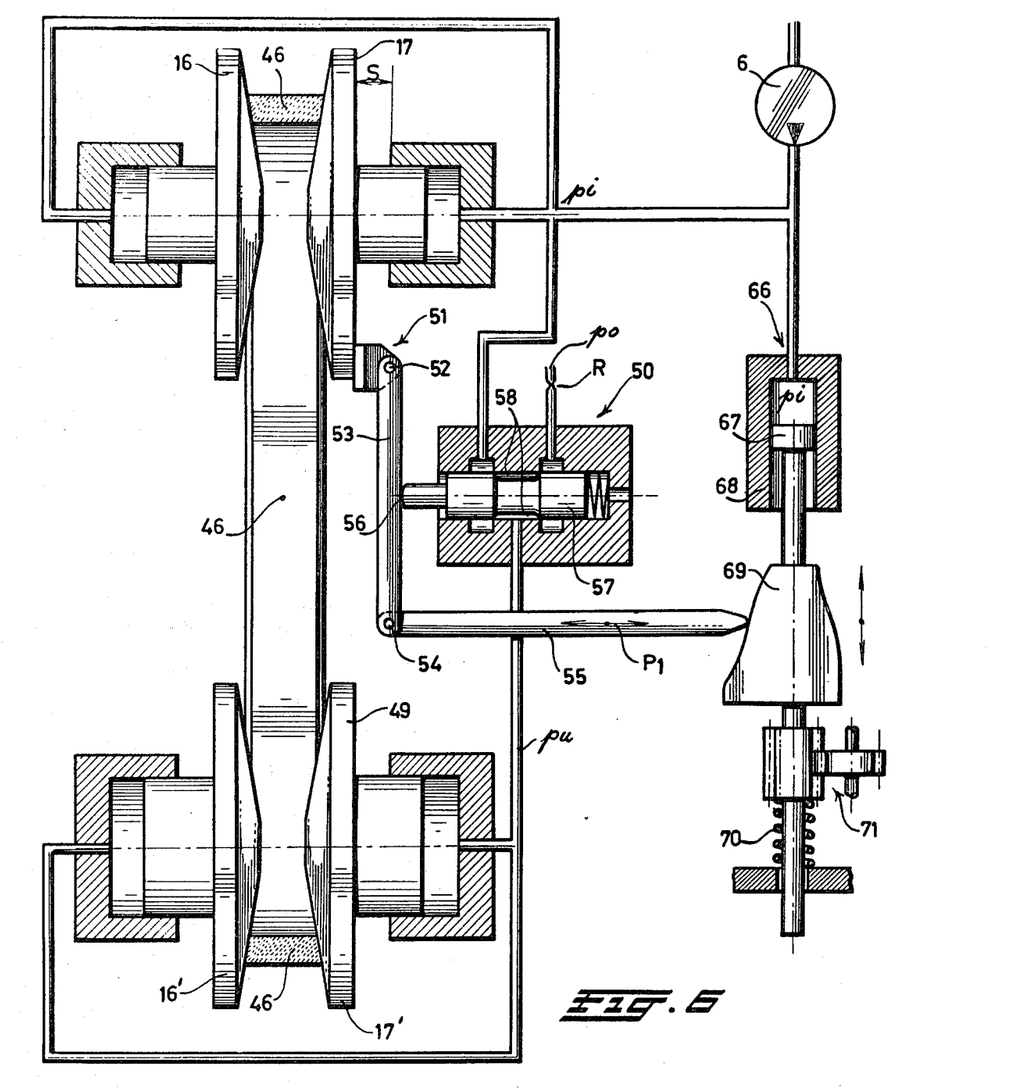
FIG. 6 shows an outline comprising elements, partly in cross section, of a pressure reduction device with the addition of a device for automatization of the transmission control in dependence of the torque and the gas valve adjustment.

Two methods will successively be described for operating the abovementioned pressure reduction in such a way that the desired transmission ratio will be maintained for variable $P_i$:

a. by feedback with a feeler of the variator position.
b. without a feedback (thus without a feeler).

ad a. (FIG. 6)

A position feeler 51 runs against one of the flanks of a conical disc 17 of the primary variator section. One end 52 of a lever 53 is linked to the feeler 51 and follows the axial shift of the flank, so that a variator position feeler is obtained. The other end 54 is used for adjusting the desired position of the variator by an adjusting arm 55 as indicated by arrows $P_1$. Means for adjusting arm 55 will be discussed hereafter. A point 56 between the outer ends of the lever 53 is coupled to a hydraulic slide valve 57, which adjusts the pressure $p_u$ between the main pressure $p_i$ and the zero pressure $p_o$.

When for any reason the cone body 17 moves to the right the slide 57 is also moved to the right so that the connection between the chamber 58 receiving pressure $p_u$, and the zero pressure $p_o$, is enlarged. Thus $p_u$ is lowered in chamber 58 thereby causing the lower or secondary cone body 49 to move to the right and the cone body 17 to return to the left. An analogous reasoning is valid for the reversed direction. The maximal movements to the outer side are restricted, as indicated by the stroke confining distance S in order to prevent that the pressure on the cone body would be lowered to a zero value. A fixed restriction R may also be built in the canal $p_o$ so that the change in oil supply pressure to the primary variators will always occur faster than the discharge from the second shaft to the reservoir at a pressure $p_o$.

Movement of point 54 causes another adjustment of the variator.

If a small reaction sensitivity (adjustment at a smaller drift) is wanted, then the slide valve 57 is to be set continuously intersecting in such a way, that oil is continuously leaking from $p_i$ to $p_o$. A favourable solution wherein a back coupling by a feeler can be omitted, will now be discussed under b.

ad b.

Figure 7:
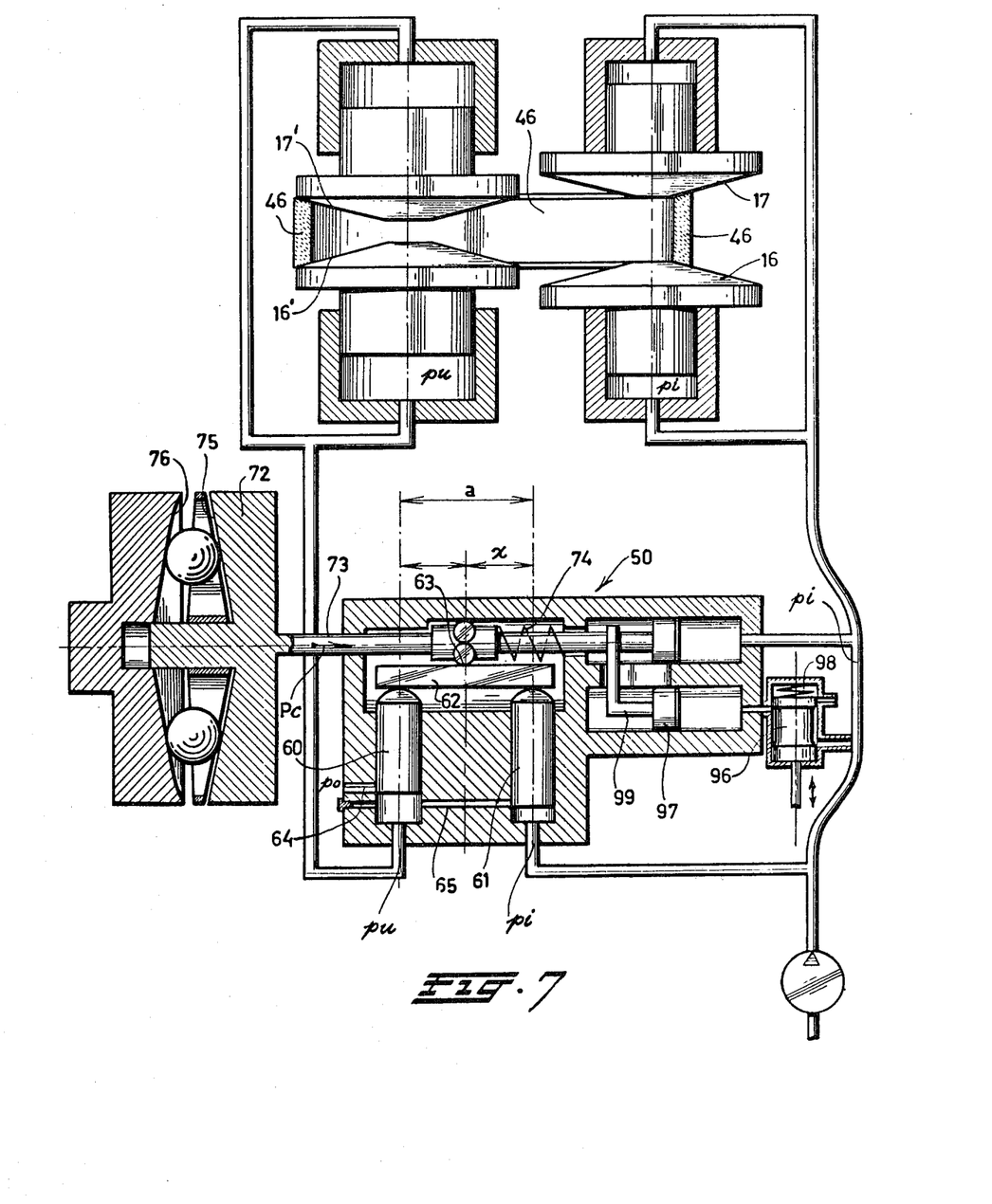
FIG. 7 is an outline for a modification of the pressure reduction device with additional apparatus for a control in dependence of the revolution speed and the moment.

FIG. 7 illustrates an embodiment, wherein two pistons 60 and 61 of a reduction device 50 act together upon a lever 62, which has an adjustable fulcrum 63. The torque dependent pressure $p_i$ acts upon the piston 61. An oil pressure $p_u$ will adjust itself in a chamber below piston 60 in dependence of the position taken by the support point 63. The distance from the support point 63 to piston 61 is indicated by x, in FIG. 7, and the distance between the pistons by a; therefore:

$$p_i x = p_u (a - x) \quad \text{(for equal piston surfaces)}$$

$$p_u = p_i \frac{x}{a - x} \text{ or } \frac{p_u}{p_i} = \frac{x}{a - x}$$

$$\text{for } x = 0 \longrightarrow p_u = 0$$

$$\text{for } x = \frac{1}{2} a \longrightarrow p_u = p_i$$

This balance is maintained; for, suppose $p_u$ would have a higher value than indicated for the above balance: piston 60 then moves upward, oil can leak out through canal 64, by which $p_u$ decreases. If $p_u$ is too low, piston 61 moves upward and oil streams through canal 65 from $p_i$ toward $p_u$, by which $p_u$ increases.

By means of this percentage-wise acting valve it is possible to set the variator at a predetermined position.

When the torque increases all forces in the variator will increase percentage-wise ($p_i$ increases, $p_u$ follows to the same extent etc.), whereby the variator remains in its chosen position independently of the load, for reasons of symmetry.

Now it is desirable to improve this percentage-wise active reduction valve yet in a way by which also very low initial pressures can be handled without the risk that the piston 61 will be immobilized when the support point 63 is above piston 61 and arrangements for this purpose will be described hereafter.

C. Further implementation of the invention onto a complete control system applicable to traction vehicles:

It is started herein from element arrangements as shown in FIGS. 6, 7, 8 and 9 each relating to a possibility of automatic adjustment of the transmission ratio.

Method I.

(FIG. 6) Adjustment dependent on torque and gas valve position.

Until now when discussing FIG. 6, only the part of FIG. 6 relating to the oil reduction device 50 for maintaining a "desired" transmission ratio for variable factor $p_i$ has been explained. Now the mechanism 66 of that Figure is considered for determining the position of the point 54 by means of the adjusting arm 55, in order to adjust the desired variator situation at any moment. In this mechanism 66 the torque-dependent oil pressure $p_i$ tends to move the piston 67 downward in a cylinder 68. A spherical cam 69 is connected to the piston 67 and moved also downwardly thereby against the pressure of a spring 70. A geared transmission 71 provides a rotation of the body 69 in correspondence with the adjustment of the gas valve. The transmission ratio can be predetermined for every combination of gas valve position and a torque as produced. The desired shift of point 54 is now realized by a corresponding shape of the outline of the spherical cam 69. The position of rod 55 determines the transmission ratio in the way as has been described before.

Method II.

(FIG. 7) Adjustment dependent on torque and speed.

The torque dependent oil pressure $p_i$ supplied to the pressure reduction valve 50 tends to bring the shiftable support 63 to the left $$(\frac{x}{a} - \frac{1}{2}).$$

A centrifugal follower 72, 75, 76 construction as a ball centrifuge is connected with the primary variator side, tending to move the support 63 by means of the ball centrifuge counter runway disc 72 and the rod 73 to the right, as indication by the arrow $P_c$. The force exerted, indicated by the arrow $p_c$ is proportional to the speed of rotation. At standstill a pressure spring 74 positions the support 63 in the mid point ($x = \frac{1}{2}a$). Any given transmission ratio can be realized for a predetermined combination of rotation speed and torque by adaptation of the shape of the ball race surfaces 75 and 76 within the centrifugal follower.

Method III.

(FIG. 8) Adjustment in dependence of torque and motor vacuum.

Figures 8, 9:
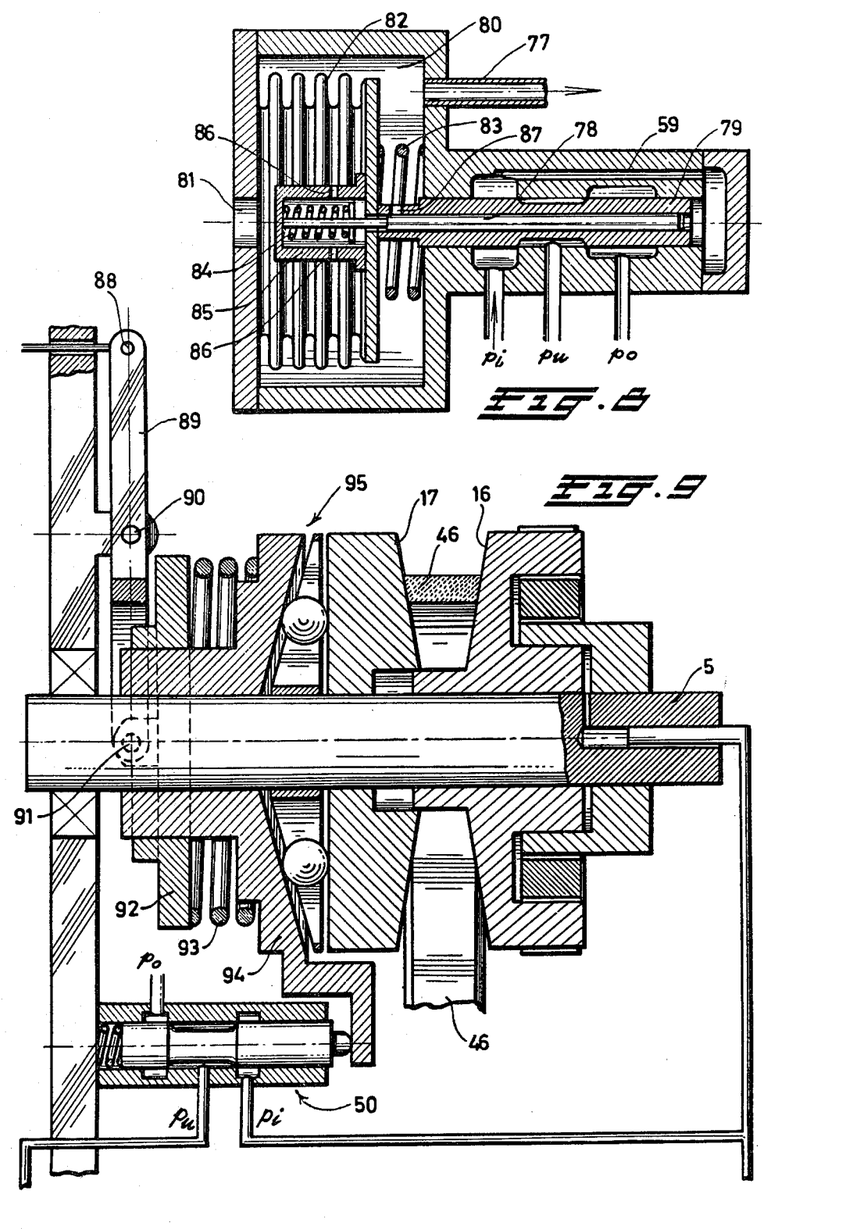
FIG. 8 a longitudinal section of a control device for a control in dependence of torque and motor vacuum.
FIG. 9 is an outline showing in cross section components for a control in dependence of revolution speed and gas valve position and FIG. 10 a motor diagram relating to working lines for maximal economy and maximal capacity.

This figure shows a slide valve housing with an oil inlet indicated by $p_i$ which is connected to the primary conical discs $F_1$ as explained before. An outlet $p_u$ applies pressure on the secondary discs $F_2$. The torque-dependent pressure $p_i$ is supplied through canal 59 to the head of the plunger side 79 and therefore the slide tends to move to the left. However, in chamber 80 the motor vacuum is present by way of conduit 77, causing in the chamber the bellows 82, which is internally at surrounding air pressure by opening 81 and against which the slide 79 finds support, to tend to expand against the pressure of the spring 83 until an equilibrium has been attained. When the rotation speed increases and the torque remains substantially constant, then the vacuum increases and the plunger 78 moves to the right. Thereby $p_u$ enters in connection with $p_o$, by which the pressure on the secondary conical discs $F_2$ decreases, and the variator's gear ratio will decrease, so that the rotation speed will decrease again.

Inversely the variator will gear down on a decrease of the motor vacuum (and of the rotation speed). When the gas pedal is pushed down, the torque-dependent pressure increases and the vacuum decreases, by which a gearing back will immediately set in. As soon as the rotation speed increases the gear ratio increases again. When the gas pedal is released, then the motor vacuum increases and the torque-dependent pressure decreases, causing gearing up. However, when a further braking by the motor is applied, the torque-dependent pressure is so much lessened (the braking torque of the motor is always much lower), that an inner plunger rod 78, in a central bore running through the plunger slide 79, will move to the right-hand side in the Figure, under the influence of the force of a spring 84. This spring 84 bears on the bottom of a small chamber 85, which is located within the bellows 82 against the forewall thereof. The chamber 85 is in open connection with the interior of the bellows through openings 86 and therefore with the atmospheric air. Because of said movement of the plunger rod 78 the atmospheric air can now enter into the vacuum chamber 80 through the opening 87 in the plunger slide 79. Thereby the plunger side 79 moves to the left under influence of the spring 83 and changes the motor back to a lower gear, by which a stronger braking by the motor becomes possible.

Method IV.

(FIG. 9) Adjustment dependent on speed and gas valve position.

This adjustment can accomplish a fixed rotation speed at a given gas valve position. Thus predetermined combination of torque and rotation speed can be controlled by the gas valve. The trans-mission ratio is being adapted fast or slow in dependence of the position of the gas valve, so that any style of driving can be realized.

The gas valve is connected to a point 88 of a lever 89 provided with a fulcrum 90. When the gas valve is opened point 88 is moved to the left in the Figure. and a ring disc 92 which is connected in pivots 91 to a fork-shaped arm of the lever is pressed to the right against the action of a spring 93. The spring 93 presses against the disc 94 of a ball centrifuge 95. The balls will run on a smaller radius because of the pressure from the spring 93, by which the disc 94 is moved to the right, thereby gearing the variator back through the reduction device 50. The rotation speed increases and as the centrifugal force on the balls increases above the spring force, the disc 94 shifts to the left and gears the variator up through the intermediary of the reduction device 50. Owing to this the rotation speed will decrease again, until a new equilibrium has adjusted itself. For, when the rotation speed decreases on maintaining the gas valve position, the variator will gear back. Therefore the rotation speed increases onto the original value.

Figure 10:
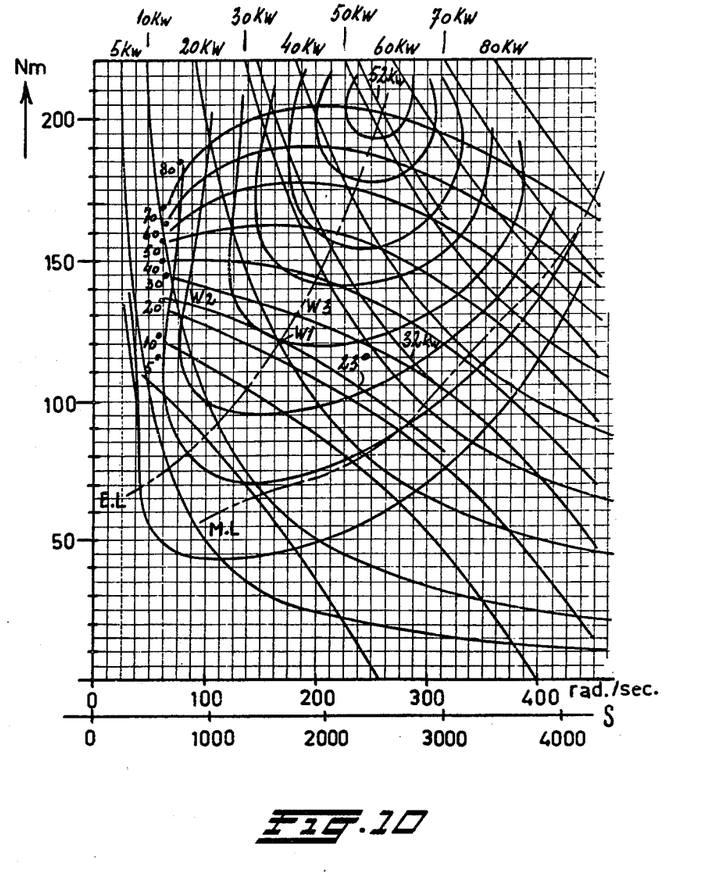

Comments (FIG. 10)

In FIG. 10 a general exposure of a motor characteristic is shown in a way known per se. It appears therefrom that two lines of action can be represented independent of the position of the gas valve (in degrees):

(1) E.L.: the economy line.

Points of this line represent the action points of the motor (couple and corresponding rotation speed) at minimum fuel consumption per kw.

(2) M.L.: the maximum power line.

The points on this line represent the action points at a maximal capacity of the motor.

These lines do not coincide and both have mostly a more than linear increase at an increasing rotation speed.

For the present arrangement of an automatic gear the choice is made in first instance for following the economy line. Then the following considerations are valid for dimensioning the control system.

Assumption: the motor rotates in the action region which is indicated by $W_1$ in FIG. 10 ($n = \pm 1560$, $M = 12.5$ Kgf m), and it is further supposed for an example that the resistance met by the autocar increases (e.g. uphill).

Without an automatic control the speed of rotation will decrease thereby and the desired, torque will increase, one and the other according to the couple-speed curve at a gas valve position at 23° (e.g. $W_2$). The oil pressure has increased herewith and the "rotation speed force" has decreased; hereby the point of support in the reduction device 50 is shifted to the left; this causes a larger deceleration rate so that the rotation speed can increase again, by which the torque decreases again until the motor has again reached action point $W_1$. The vehicle has obtained a lower velocity because of the change in the transmission ratio. To realize a higher velocity again the gas valve has simply to be adjusted onto 30° e.g.m. by which the rotation speed and the torque increases.

The adjusting force to the left: $P_v + p_i F$ $p_v$ = possible spring force $P_i$: oil pressure (being proportional to the motor moment)

F: effective piston surface

The adjusting force to the right $(m\omega^2)/(\tan\phi)$

By a right choice of the abovementioned parameters it is possible for any motor to follow the E.L. line.

Transition from E.L. to M.L.:

Though it is supposed sometimes that it is better to follow the M.L. line when accelerating fast, this is only relatively true for it is assumed that one wants to accelerate by proceeding (in the example as chosen) from ±23 gas valve position to 30°. According to the E.L. line the action point of the motor passes then by way of the transmission adjustment from $W_1$ to $W_3$, corresponding with a power change from ±20 to ±25 KW. One has then ±5 KW available for the acceleration of the vehicle and that a minimal motor spirit consumption. Where one would transit to the M.L. line at this acceleration via another transmission regulation, then ±32 KW would become available at this gas valve position and thus 12 KW for the purpose of accelerating. This goes faster indeed, but the same result could also be obtained by pushing the gas valve onto 45° and then to stay on the E.L. line. It is self-evident that the latter is to be preferred. However, this method is restricted per se by the maximal gas valve position.

Herefrom the following general rule can be derived: when a particular acceleration power can also be obtained by opening the gas valve further at the E.L. line, the course along the E.L. line is to be preferred to a course corresponding to the M.L. line.

However, it is not possible to do more than opening the gas valve on its maximum (so-called bottom gas). Thus when one wants to free a power larger than 52 KW (look at example: maximal power along E.L.) then one has to:

(a) give full gas (b) pass gradually to the M.L. line

The latter can simply be reached by providing the gas pedal with an arrangement, by which it can yet be pushed further inward (so-called "Kick down") after the gas valve has been fully opened. A signal to be issued thereby is then used for the supply of an additional adjusting force (to the left) to the reduction valve. Thereby as it were, an additional back gear is introduced, the motor is going to turn with extra speed, by which the available power increases.

A particular advantageous embodiment is obtained when (FIG. 7) by a kick down of the gas pedal a slide 96 is moved against the action of a spring 98, by which movement $p_i$ is connected with the pressure side of a piston 97. The latter shifts the support point 63 to the left through an arm 99.

Braking control:

When from a particular action point the gas valve is released on-to a stationary minimum position, the adjustment will tend to follow the E.L. line. Never results in braking of the motor. However, admittedly such braking should not happen (compare driving with a manual gear shift served by hand).

However, under certain circumstances it is desirable or even necessary to be able to brake the motor, for example when going down from slopes.

This can be obtained in implementing the invention by designing the gas pedal in such a way, that it shuts in rest position (foot lifted from the gas pedal) the gas valve on to "stationary," the last small portion of the gas pedal shifting a proportional valve 96 in FIG. 7 upward, whereby also the piston 97 is pressurized and thereby gears back to a lower acceleration. We call this "let up." FIG. 7 shows the slide 96 in the position for "kick down" or "let up." At the normal pedal position the slide 96 is in an upper position. The control methods mentioned above have the following advantages:

(A) In the "normal" action region the gas pedal is linked stiffly to the gas valve (with response as usual which is most advantageous, for example for a cold start);

(B) Driving occurs automatically along E.L.;

(C) By pushing the gas pedal further down the M.L. line is followed automatically. This is appealing as the driver can communicate this information to the same element (gas pedal);

(D) The braking by the motor is possible by fully releasing the gas pedal. During the last phase a strong deceleration can be realized ("let up").

This is also appealing to the driver: driving still slower than at "low gas," can be done now as a self-evident measure by fully releasing the gas pedal.

What we claim is:

1. An infinitely variable cone pulley gear arrangement comprising an endless transmitting element such as a belt or chain running between two pairs of conical discs, one of these on a driving shaft and the other on a driven shaft, at least one disc of each pair being slidable in axial direction on its shaft, hydraulic means producing a control axial pressure on the slidable cones so as to adjust themselves automatically in dependence of the torque transmitted by the driving shaft to the driven shaft, a hydraulic service line receiving a pressure fluid such as oil from a suitable source under pressure and distributing the pressure to the cones to be pressurized, wherein, within a coupling element between a driving motor and a variator section driven thereby a hydraulic cushion is applied so sole means for the transfer of the torque to or from said variator section, free of metallic contact between said variator section and said driven shaft, said service line being connected to a chamber for hydraulic medium in said coupling element, wherein the pressure created in said cushion depends on torque.

2. An arrangement as defined in claim 1, wherein at least one of said conical discs of each pair thereof forms the axially movable element of a hydraulically pressurized cylinder and wherein, the said service line is connected with one or more pressure chambers of a first pair of conical variator discs and proceeds from there onward to the pressure chamber of the second pair of conical variator discs.

3. An arrangement defined in claim 1, wherein a hydraulic cushion chamber is enclosed in a shaft coupling which comprises two coaxial half couplings said hydraulic cushion being formed by pressure medium supplied from the service line and leaking into a clearance between engaging surfaces on each of the said half couplings.

4. An arrangement as defined in claim 3, wherein one of said half couplings has at least one axially extending coupling arm which is engaged, leaving sideward clearance between parallel side walls of a cavity in the other of said half couplings, bores in one of the half couplings being connectable with the cushion chamber having exits into the clearances.

5. An arrangement as defined in claim 4, wherein the two exits opposite to each other are both in a slide valve which is shiftable to and from right across through the portion of the coupling arm which extends into the second half coupling, the shifting bringing about a communication each time of one of the exits with the service line canal passing through the coupling arm and closing the other one in dependence of the engagement of the arm with one or other of the side walls of the cavity in the opposite half coupling.

6. An arrangement as defined in claim 5, wherein the slide valve for shaping a power transmitting hydraulic cushion has the shape of a hollow cylinder enclosing two chambers with exits separated from each other by a central disc-shaped wall having a ring rib-shaped extension beyond the circumference of said cylinder, said rib being enclosed with sideward and circumferential clearance in a ring canal of a cylindrical bearing for the said cylinder the ring canal communicating with an outer hydraulic medium pump and being connectable to the chambers through radial openings in the cylinder wall near the central disc, the connection being made for one of the chambers and shut off for the other one in dependence of the sense of rotation of the driving half coupling and the corresponding movement of the slide onto engagement of the disc with one side of the ring canal and disengagement with the other side in said disc bearing.

7. An arrangement as defined in claim 5, wherein the exits each comprise a floating valve disc covering an engaging area of the opposite half coupling and leaving a variable leakage slit wherein the pressure of the hydraulic cushion is built up and determined in dependence of the torque to be transmitted between the circumference of each valve disc and the surrounding exit mouth.

8. An arrangement as defined in claim 5 including a rotation shaft and a flat differential disc, one of said coupling halves being connected to said rotation shaft via said flat differential disc.

9. An arrangement as defined in claim 3, wherein one of said half couplings is designed as one of the cones of a pair of conical discs between which the transmitting belt runs.

10. An arrangement as defined in claim 2, wherein, an adjustable pressure reduction device is inserted in the part of the service line which connects the pressure chamber of a first variator section formed by a first pair of conical discs with the pressure chamber of a second variator section comprising a second pair of conical variator discs.

11. An arrangement as defined in claim 10, wherein the pressure exposed surface of the pressure chamber of the conical discs of one variator section is smaller than the pressure exposed surface of the pressure chamber of the other variator section.

12. An arrangement as defined in claim 11 including a piston surface on said second pair of conical variator discs and a pressure reduction device, said piston surface being at least so much larger than said first pair of conical discs that with equal hydraulic pressure on both piston surfaces said arrangement takes a farthest position, so that the entire adjustment range can be followed exclusively by decreasing the hydraulic pressure in said pressure reduction device.

13. An arrangement as defined in claim 10, wherein the adjustment means for the position of the pressure reduction device is under the control of a back coupling mechanism comprising a variator position feeler.

14. An arrangement as defined in claim 13, wherein said pressure reduction device comprises a control slide valve provided with an axially extending control rod the outer end of which forms a point of support for a two-armed lever, one outer end thereof being adjustable to a predetermined setting and the other outer end to a variator position feeler scanning the portion of a conical variator disc, whereas the control slide valve, in dependence of its position, shuts off a variable portion of a hydraulic medium passage and adjusts a connection of the pressure chamber of the cone which is coupled with said feeler with a canal to the low pressure side of the service line.

15. An arrangement as defined in claim 14, wherein a restriction is inserted into an outlet canal from the pressure reduction device to the low pressure side.

16. An arrangement as defined in claim 14 wherein the displacement of said control slide valve is restricted so that connection to said outlet channel is prevented from being fully disrupted.

17. An arrangement as defined in claim 11, wherein the pressure reduction device is devised as an adjustable proportional reduction valve, the position of the adjusting element for the said valve determining the proportion of the hydraulic pressures in the pressure chambers of one of the variator sections with respect to those of the other variator section.

18. An arrangement as defined in claim 17 including adjustment means formed by a shiftable fulcrum of a two-arm lever, a shaft coupling; two cylinder pistons on a reduction slide valve, said pistons being under hydraulic pressure in one of said variator sections while controlling passage of hydraulic medium between said variator sections so that in any position of said fulcrum all forces in said arrangement vary percentagewise with the pressure of said medium, said pressure being proportional to a torque transmitted in said shaft coupling, said arrangement being maintained in a chosen position independent of load.

19. An arrangement as defined in claim 14, adapted for the control of the transmission ratio in a gas motor traction vehicle in dependence of the torque and of the gas valve position wherein the position of the outer end of the control slide valve adjustment rod is made adjustable to a control position in dependence of the axial movement of a rotatable spherical cam under the influence of the pressure shaped in the hydraulic cushion, the rotational position of the cam being made dependent on the gas valve adjustment.

20. An arrangement as defined in claim 18 for controlling transmission ratio in a motor vehicle depending on torque and speed of rotation wherein the position of said fulcrum of said two-arm lever is dependent on a force derived from said speed of rotation and on a force derived from the torque-dependent pressure of said hydraulic medium.

21. An arrangement as defined in claim 10 for controlling the transmission ratio in a motor traction vehicle depending on torque and motor vacuum, including a bellows with interior connected to atmospheric air and a vacuum chamber connected to motor vacuum, said bellows being located in said vacuum chamber; a pressure reduction slide valve loaded by pressure in said air cushion and by a spring, said slide valve being controlled by said bellows; said slide valve having an axially movable plunger for connecting outside air to said vacuum chamber under the influence of braking on said motor and resulting decrease of torque-dependent pressure for changing the influence of said torque dependent pressure.

22. An arrangement as defined in claim 10, adapted for the control of the transmission ratio in a gas motor traction vehicle in dependence of the revolution speed and of the gas valve position, wherein the gas valve is connected with a point of application on one arm of a two-armed lever, the other arm by means of a spring exercising pressure upon one of runway discs of a ball centrifugal regulator serving the pressure reduction device.

23. An arrangement as defined in claim 3, the arrangement being designed as an automatic transmission, and adjusted for following the economy line, a gas pedal being provided with means for admitting a movement along a predetermined track past the position for a fully opened gas valve, a control means being connected with an additional track providing for the introduction of an additional adjustment force on the reduction valve for gearing back to a higher revolution speed.

24. An arrangement as defined in claim 18, wherein a control means to be enacted on the additional gas pedal track is formed by a valve to be opened in a branch line of an input pressure line, said branch leading to a control cylinder of a piston, which is connected with the shiftable lever support point.

25. An arrangement as defined in claim 3, the gas pedal being provided with means enabling a movement of the gas pedal along a track backward of its position for "stationary," a control means being enacted in this additional track for the supply of an adjustment force to the pressure reduction device in the sense of gearing back.

* * * * *